United States Patent [19]

Fitzgerald et al.

[11] Patent Number: 5,603,470
[45] Date of Patent: Feb. 18, 1997

[54] AIRBORNE TOWED AEROBODY EMPLOYING AN EXPENDABLE TOWING/DEPLOYMENT MECHANISM

[75] Inventors: Patrick J. Fitzgerald, Northridge; Joseph A. Wysocki, Malibu; John Fialko, Long Beach, all of Calif.; Ronald B. Chesler, Tucson, Ariz.

[73] Assignee: Hughes Electronics, Los Angeles, Calif.

[21] Appl. No.: 371,259

[22] Filed: Jan. 11, 1995

[51] Int. Cl.⁶ .................. B64D 3/00; B64F 1/04; B63B 21/60; F41F 5/00
[52] U.S. Cl. .............. 244/1 TD; 244/63; 244/110 A; 273/360; 273/361; 89/1.34; 89/1.51; 89/1.57; 114/242
[58] Field of Search ................ 294/1 TD, 33, 294/63, 110 R, 110 A, 137.4; 273/360, 361; 89/1.34, 1.51, 1.57, 1.811; 114/242, 243

[56] References Cited

U.S. PATENT DOCUMENTS

| | | | |
|---|---|---|---|
| 2,392,199 | 1/1946 | Steiger | 244/33 |
| 2,650,127 | 8/1953 | Carlson | 89/1.57 |
| 2,889,895 | 6/1959 | Snow | 244/110 A |
| 3,810,671 | 5/1974 | Jeffery | 89/1.57 |
| 4,327,644 | 5/1982 | Stancil | 89/1.34 |
| 4,718,320 | 1/1988 | Brum | 244/1 TD |
| 4,770,368 | 9/1988 | Yates et al. | 273/361 |
| 4,852,455 | 8/1989 | Brum | 244/1 TD |
| 4,903,607 | 2/1990 | Clark | 89/1.34 |
| 5,035,169 | 7/1991 | Chapin et al. | 89/1.34 |

Primary Examiner—Gregory L. Huson
Assistant Examiner—Lissi Mojica
Attorney, Agent, or Firm—Leonard A. Alkov; Wanda K. Denson-Low

[57] ABSTRACT

A launching and regulation system that incorporates an expendable towing and deployment mechanism for use with a towed aerobody that provides for launching and controlled tow line payout between the towed aerobody and a towing vehicle. The system comprises a housing, a nonrotating spool disposed in the housing, and a tow line wound around the spool that is coupled between the aerobody and the vehicle. The tow line preferably comprises a photonic, fiber optic, link. The launching mechanism comprises a plurality of impulse cartridges for deploying the aerobody and severing the tow line at a predetermined time. A spring piston is disposed inside a wedge-shaped tube that confines expanding gasses within the tube that are generated by an impulse cartridge and moves the spring piston to launch the aerobody. The regulation mechanism may comprise a mechanical system or adhesive resin system. The mechanical system comprises a rotatable wedge-shaped tube, and the tow line is wrapped around it. A rotatable mechanical regulator is slidably coupled to the wedge-shaped tube. The regulator rotates with the tube and move transversely along the length of the tube as the tow line unwinds. A brake mechanism and a brake drum are provided to control payout of the tow line. The adhesive resin system comprises an adhesive resin coating disposed on the tow line that has an adhesion coefficient that permits it to peel off of the spool at a predetermined rate. Either regulation system provides the ability to control the rate at which the tow line comes off of the spool such that tow line tension is regulated during deployment. A severing mechanism is provided for severing the tow line using an impulse cartridge.

13 Claims, 2 Drawing Sheets

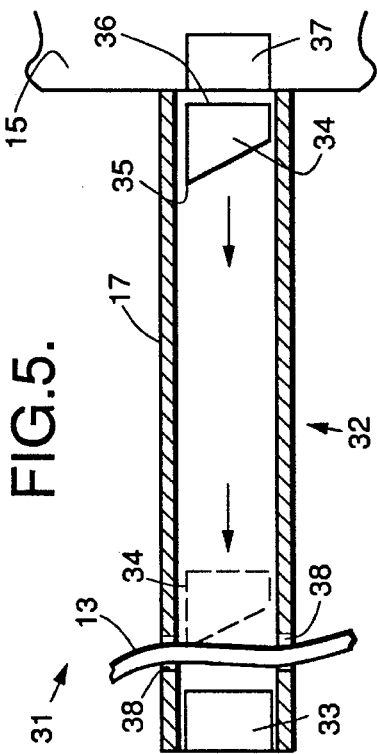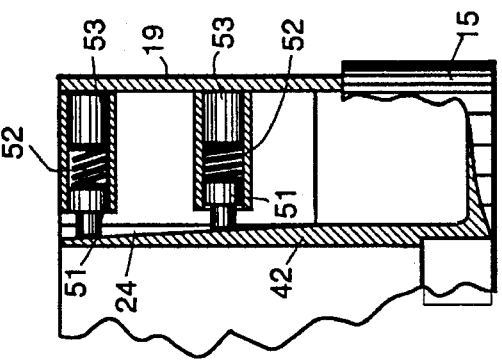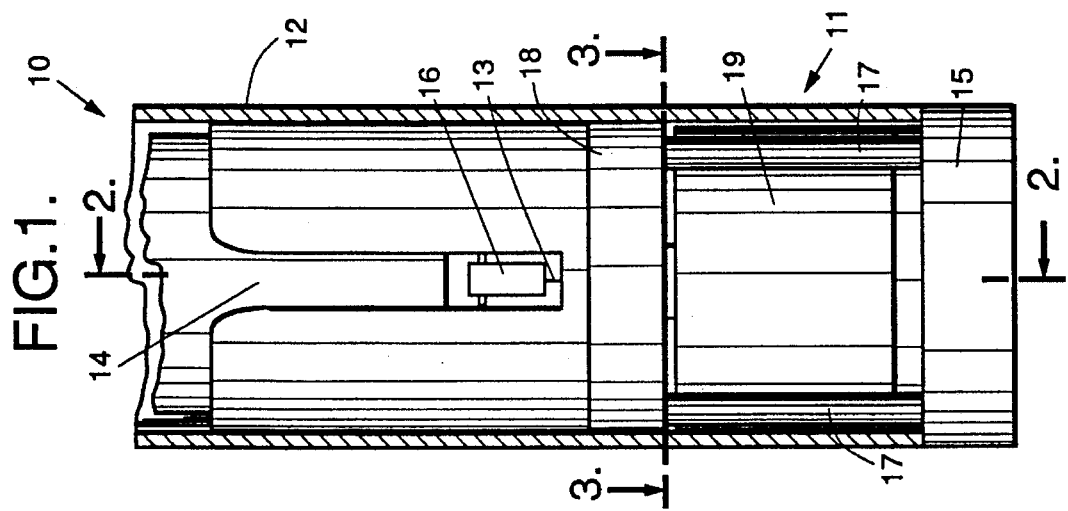

AIRBORNE TOWED AEROBODY EMPLOYING AN EXPENDABLE TOWING/DEPLOYMENT MECHANISM

CROSS REFERENCE TO RELATED APPLICATIONS

Cross reference is made to U.S. patent application Ser. No. 08/371,308, filed Jan. 11, 1995 and U.S. patent application Ser. No. 08/371,303, filed Jan. 11, 1995, both of which are assigned to the assignee of the present invention, and which are incorporated herein by reference.

BACKGROUND

The present invention relates to towing and deployment mechanisms for expendable payloads, and more particularly, to an expendable towing and deployment mechanism for use with a towed aerobody that provides for launching and controlled tow line payout between the towed aerobody and a towing vehicle.

The closest prior art to the present invention is used in the existing ALE-50 towed decoy, currently in the inventory of the U.S. Armed Forces. The ALE-50 system is comprised of a decoy, a canister and a reel/payout mechanism. The ALE-50 system uses three copper wires to act as a data link between the decoy and a host aircraft that tows the decoy. The ALE-50 system uses a rotating reel with mechanical braking and electrical sliprings for the data link. The ALE-50 system has a rotating tow line reel which uses the sliprings to bridge the rotating electrical coupling between the stationary canister and the rotating reel. As a result of using the rotating reel, a conventional mechanical braking system must be used which adds weight, increases the complexity of the system and reduces the space available for tow line storage. In addition, the design of this system precludes the use of a continuous fiber optic tow line.

Therefore it is an objective of the present invention to provide for an improved towing and deployment mechanism for a towed aerobody that provides the ability to use a fiber optic tow line, and provides for varying deployment regulation mechanisms.

SUMMARY OF THE INVENTION

In order to meet the above and other objectives, the present invention provides for a launching and regulation system that incorporates an expendable towing and deployment mechanism for use with a towed aerobody that provides for launching and controlling tow line payout between the towed aerobody and a towing vehicle. The system comprises a housing, a nonrotating spool disposed in the housing, and a tow line wound around the nonrotating spool that is coupled between the towed aerobody and the towing vehicle.

The launching portion of the present invention comprises a plurality of impulse cartridges disposed in the housing for deploying the aerobody and severing the tow line at a predetermined time. A spring piston is disposed inside a wedge-shaped tube that is adapted to confine expanding gasses within the tube that are generated by a selected one of the impulse cartridges and that is adapted to move the spring piston to launch the towed aerobody.

The deployment regulation portion of the present system may comprise a mechanical system, or an adhesive resin system. The mechanical system comprises a rotatable wedge-shaped tube is disposed in the housing, and the tow line is wrapped around it. A rotatable mechanical regulator is slidably coupled to the rotatable wedge-shaped tube. The regulator is adapted to rotate with the tube and move transversely along the length of the tube as the tow line is removed from the spool. A brake mechanism is disposed in the rotatable mechanical regulator, and a brake drum is disposed adjacent the periphery of the regulator that is contacted by the brake mechanism. The adhesive resin system employs a fixed spool and a tow line wound around the fixed spool. The tow line has an adhesive resin coating disposed thereon that has an adhesion coefficient that is adapted to permit the tow line to peel off of the spool at a predetermined rate. With either system, provides the ability to control the rate at which the tow line comes off of the spool such that the tow line tension is regulated during deployment. With the adhesive resin system, for example, by controlling and/or increasing the adhesive strength on the last windings of the tow line, the tow line payout rate may be reduced to smoothly stop when the end of the tow line is reached. This eliminates any sudden jerking motion which could damage or break the tow line.

The present system preferably uses a photonic, fiber optic, link between the towing vehicle (typically an aircraft) and the deployable towed aerobody. The advantages of using the fiber optic towline are faster data communication rates, no electromagnetic interference, lower loss per unit length so that longer tow line lengths can be used, and fiber optic lines are immune to electrical interference. Also the fiber optic line does not conduct electricity and therefore does not promote lightning attachment as it is known in the art, and does not degrade the radar cross section of the towed aerobody. The photonic link increases the transmission bandwidth and allows for the direct transmission of upconverted RF signals from the aircraft to the towed aerobody. This cannot be done in existing towed aerobody systems.

A severing mechanism is provided for severing the tow line and comprises a cylindrical tube, an anvil disposed at one end of the cylindrical tube, and a piston cutter having a sharp edge that is slidably disposed in the cylindrical tube. Openings are disposed in the cylindrical tube between the anvil and the piston cutter, and the tow line is routed through the openings. The tow line is severed by firing a second impulse cartridge that causes the piston cutter to move toward the anvil, and the sharp edge severs the tow line when the piston cutter impacts the anvil with the tow line between them.

The present invention thus comprises a launching and regulation system that provides for launching and controlled tow line payout between a towed aerobody and a towing vehicle. The present invention incorporates a controlled rate payout mechanism that does not require sliprings or a rotating payout reel. The payout mechanism may use a fiber optic or electrical data link between the towing aircraft and the towed aerobody. The present invention eliminates the rotating reel and the associated sliprings present in prior an systems and therefore requires fewer parts. This simplified design and reduction in parts count significantly reduces the recurring unit manufacturing cost of existing and future designs. The present invention thus provides a cost-effective improvement to existing towed aerobody systems.

The controlled rate payout mechanism allows a conventional conductive wire, fiber optic, and/or composite tow line to be dispensed in a well-controlled manner. The use of the fiber optic tow line provides for faster data communication rates, resistance to electromagnetic interference, lower loss so that longer tow line lengths can be used, and the fiber optic tow line is generally immune to electrical jamming. The fiber optic tow line does not degrade the radar cross section of the towed aerobody. The elimination of the rotating reel and electrical sliprings improves the integrity of the fiber electrical connections, thus increasing the reliability of the system. The payout mechanism thus provides a proportional control system that reduces the tow line payout rate as the tow line pays-out from the canister, thus providing a smooth stop at the end of the tow line.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a side view of a portion of a towed aerobody system in accordance with the principles of the present invention employing a launching and regulation system that incorporates an expendable towing and deployment mechanism;

FIG. 4 is a view of the system of FIG. 3 taken along the lines 4—4; and

FIG. 5 shows a severing mechanism employed in the system of FIG. 1.

DETAILED DESCRIPTION

Figure 2:
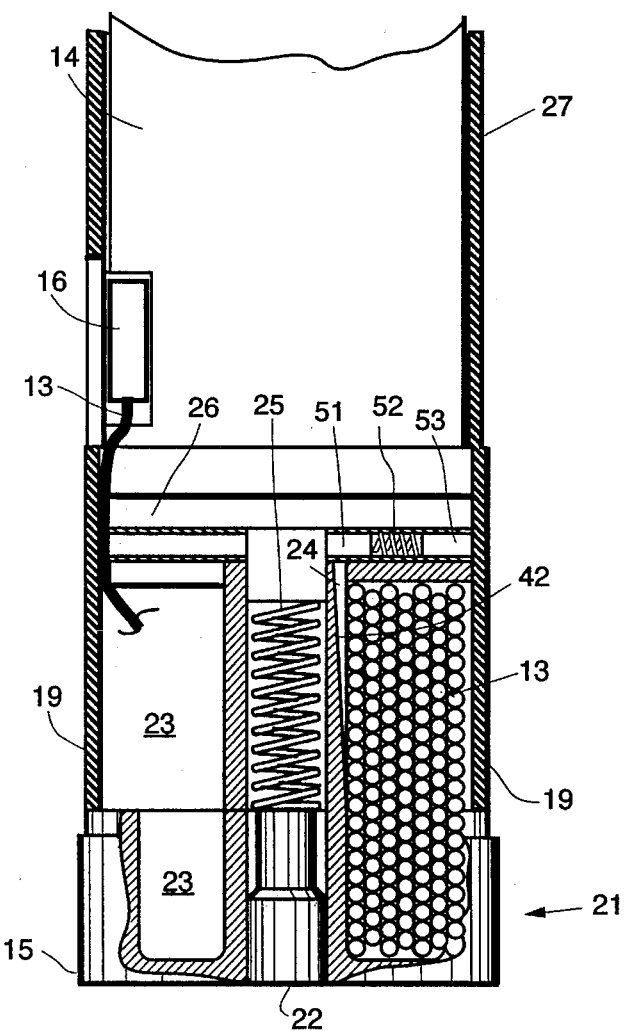
FIG. 2 is a cross sectional view of the system of FIG. 1 taken along the lines 2—2.

Referring to the drawing figures, FIG. 1 is a side view of a portion of a towed aerobody system 10 employing an expendable towing, and payout regulation mechanism 11 in accordance with the principles of the present invention. The towing and payout regulation mechanism 11 is comprised of a housing 12 that holds a tow line 13 and an aerobody 14. The towing and payout regulation mechanism 11 may have several configurations. The towing and payout regulation mechanism 11 may be a mechanical system, or an adhesive resin system, depending on the configuration of the housing 12 and the tow line 13, which in turn depends upon whether the tow line 13 has an internal or external winding, length of the tow line 13, and the weight and size of the aerobody 14. These two mechanisms 11 are described in more detail below. Furthermore, the adhesive resin payout regulation system and the mechanical payout regulation system are the subjects of U.S. patent application Ser. No. 08/371,303, filed Jan. 11, 1995 and U.S. patent application Ser. No. 08/371,308, filed Jan. 11, 1995, respectively, both of which are assigned to the assignee of the present invention.

The tow line 13 may be comprised of a photonic link including an optical fiber that may be metalized if desired based on requirements of the system 10. The tow line 13 may also include non-fiber optic (metal) conductors. Based on the particular needs of the system 10, a structural overbraid may be used to hold the multi-conductor tow line 13 together. The structural overbraid may also be used as the mechanical link between a towing vehicle (aircraft) and the towed aerobody 14, depending on the physical size of the aerobody 14.

The advantages of the fiber optic tow line 13 are faster data communication rates, no electromagnetic interference, lower loss per unit length so that longer tow line lengths can be used, and the fiber optic tow line 13 is immune to electrical interference. The photonic link increases the transmission bandwidth and allows for the direct transmission of upconverted RF signals from the towing vehicle and the towed aerobody 14. This cannot be done in conventional towed aerobody systems.

The housing 12 contains the aerobody 14, the towing and payout regulation mechanism 11 and the tow line 13 prior to deployment. The housing 12 is a rectangular metal box having blindmate connectors (not shown) disposed at one end and a protective dust cap (not shown) disposed at the other. The housing 12 typically has a square cross section, but it is not limited so any particular cross sectional shape. The blindmate connectors are mounted in a base block 15. The aerobody 14 has a tow line adapter 16 coupled between it and the tow line 13. A plurality of spacers 17 (typically 4) separate the base block from an upper mounting block 18. A regulator brake drum 19 is disposed between the base block 15 and the upper mounting block 18 and is separated from the spacers 17.

Referring to FIG. 2, it shows a partially cut-away cross sectional view of the system 10 of FIG. 1 taken along the lines 2—2, detailing the internal structure of the system 10. The base block 15 mates to a magazine 21. Impulse cartridges 22 are mounted in the magazine 21 and are used to deploy the aerobody 14 and sever the tow line 13 at the end of the life of the aerobody 14. Attached to the base block 15 and covered by the housing 12 is a fixed, nonrotating spool 23 that holds the tow line 13. The tow line is wrapped around the spool in a conventional manner. Located in the center of the spool 23 is a wedge-shaped tube 24 that contains a spring piston 25 that comprises a round disc 26 at the end thereof that faces the aerobody 14. The wedge-shaped tube 26 acts as a guide for the spring piston 25. The piston 25 and tube 26 confine expanding gasses generated by a selected one of the impulse cartridges 22 that causes the spring piston 25 to move and launch the aerobody 14.

The spring piston 25 is used to transmit gas pressure from the selected impulse cartridge 22 located in the middle of the base block 15 to the disc 26 adjacent the aerobody 14. The spring piston 25 reduces the initial forces exerted on the aerobody 14 at launch due to the compression of the spring piston 25, and then pushes the aerobody 14 out of the housing 12, driven by expanding gases from the selected impulse cartridge 22 and the stored mechanical energy of the spring piston 25. The disk 26 is used to distribute the force from the spring piston 25 over a load ring located on the outer diameter of the aerobody 14. In this manner ejection forces are directly transmitted to the aerobody 14, thus leaving the forward face of the aerobody 14 available to receive a payload.

Mounted above the spool 23 on the four spacers 17 (or standoffs) is an aerobody retaining ring 27. The retaining ring 27 holds the aerobody 14 in the housing 12 and aligns the aerobody 14, the ejection disc 26, and spring piston 25. During ejection, the housing 12 acts as a guide for the ejection disk 26 and the aerobody 14.

Figure 3:
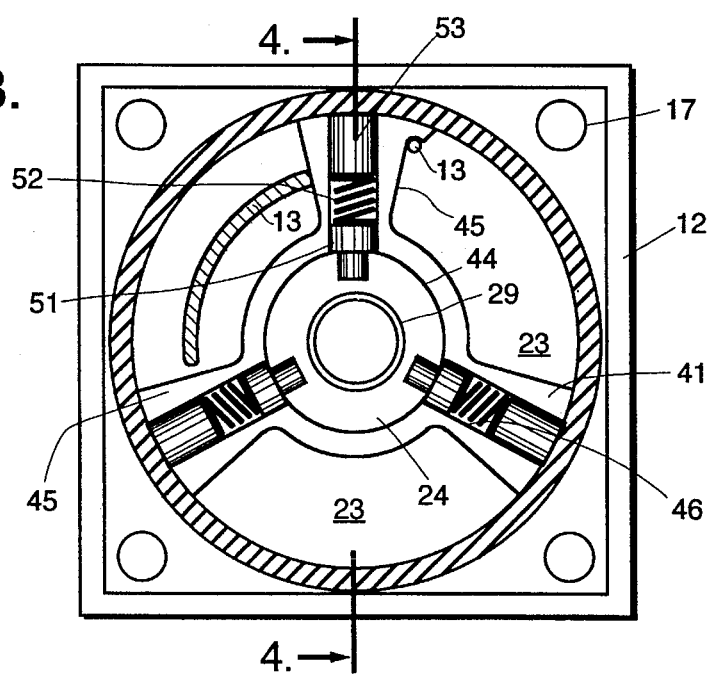
FIG. 3 is a view of the system of FIG. 1 taken along the lines 3—3.

FIG. 3 is a view of the system 10 of FIG. 1 taken along the lines 3—3. Referring to FIG. 3, a mechanical regulator 41 and the wedge-shaped tube 24 is disposed on a cylinder 29 surrounding the spring piston 25. The regulator 41 is adapted to rotate as the tow line 13 is removed from the spool 23. The regulator 41 and wedge-shaped tube 24 are free spinning on the spring piston cylinder 29. The regulator 41 is also adapted to move transversely along the length of the wedge-shaped tube 24. The wedge-shaped tube 24 is a hollow cylinder having ribs that run the length thereof. The ribs are tapered, to provide the wedge shape, and the wedged shape become wider at the bottom of the tube 24. Transverse movement allows the regulator 41 to move down the wedge-shaped tube 24 as the diameter of the tow line 13 is reduced, due to payout of the tow line 13. This is critical to maintaining a proper distance between the regulator 41 to the tow line 13. The transverse movement also controls the speed of the regulator 41.

The regulator brake drum 19 is mounted between the base block 15 and the aerobody retaining ring 27. The regulator 41 spins inside the brake drum 19. The brake drum 19 has a fine continuous spiral thread cut into its inside surface. The regulator 41 has a central hub 44 which has three arms 45 radiating outwardly, spaced 120 degrees apart. As the tow line 13 comes off the spool 21, it slides along the inside of one of the regulator arms 45 pushing the regulator 41 around the spool 23 in front of it. The three arms 45 have a free fit relative to the brake drum 19 to allow the regulator 41 to rotate within the brake drum 19. The arms 45 also have slots 46 cut into them that will be described with reference to FIG. 4.

FIG. 4 is a view of the system 10 of FIG. 3 taken along the lines 4—4. Referring to FIG. 4, the slots 46 are cut perpendicular to the axis of rotation of the regulator 41. Weights 51, a spring 52 and a brake pad 53 are disposed in the slots 46. The weights 51 ride on the wedge-shaped tube 42 and the brake pad rides on the brake drum 19.

As the regulator 41 spins the brake pads 53 move to the end of the arms 45 due to centrifugal force, and rub on the brake drum 19. The friction between the brake drum 19 and the brake pads 53 creates a force which slows or inhibits the rotation of the regulator 41. This frictional force is directly proportional to the pressure of the brake pad 53 on the brake drum 19. The pressure the brake pad 53 exerts on the brake drum 19 is directly proportional to the rate at which the regulator 41 spins. Thus the faster the regulator 41 spins the greater the braking force.

The brake pads 53 also catch on the fine continuous spiral thread cut into the inside surface of the brake drum 19. The catching action is similar to a screw in a threaded hole, wherein the regulator 41 represents the screw and the brake drum 19 represents the threaded hole. The result is that the regulator 41 moves closer to the winding as the winding decreases in size, preventing the tow line 13 from fouling upon itself or winding on the wedge tube 24.

As the regulator 41 moves down the wedge-shaped tube 24, the weights 51 fide up on the wedges 42 and press on the spring 52 which in turn presses on the brake pads 53, thus increasing the effective pressure the brake pads 53 exert on the brake drum 19. This increases the braking force and reduces the rate at which the tow line 13 unwinds off of the spool 21. Therefore, as the end of the tow line 13 is reached, the tow line 13 payout rate is reduced. The braking force is steadily increased until regulator speed is minimal. This creates a smooth stopping motion and minimizes tension in the tow line 13 as the end of the tow line 13 is reached. The result is a mechanism 11 wherein control is related to the deployment speed as well as the amount of tow line 13 left on the winding.

Referring to FIG. 5, built into one of the spacers 17 is a severing mechanism 31. The severing mechanism 31 is comprised of a tube type cylinder comprising the spacer 17, an anvil 33 and a piston cutter 34. The tube type cylinder 32 acts as a stand-off and contains the piston cutter 34 and anvil 33. The piston cutter 34 has a sharp edge 35 on one end and a flat surface 36 on the other. This piston cutter 34 is driven by the gas from a second impulse cartridge 37 located in the base block 15 of the housing 12. When the second impulse cartridge 37 is fired the piston cutter 34 is driven toward the anvil 33 by the expanding gas therefrom. The tow line 13 is routed through holes 38 in the tube and between the piston cutter 34 and the anvil 33. The sharp edge 35 severs the tow line 13 when the piston cutter 34 impacts the anvil 33 with the tow line 13 between them.

As should be clear from the above, the system 10 of the present invention may be configured in several ways. The base block 15, aerobody retaining ring 27, severing mechanism 31, and ejection system comprising, the impulse cartridges 22 and spring piston 25, are the same for each of the housing configurations. The towing and payout regulation mechanism 11 may have several configurations as were described above. The towing and payout regulation mechanism 11 may be a mechanical system, or an adhesive resin system, depending on the configuration of the housing 12 and the tow line 13, which in turn depends upon whether the tow line 13 has an internal or external winding, length of the tow line 13, and the weight and size of the aerobody 14.

Thus there has been described a new and improved expendable towing and deployment mechanism for use with a towed aerobody that provides for launching and controlled tow line payout between the towed aerobody and a towing vehicle, and provides for use of a fiber optic link between the towed aerobody and a towing vehicle. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A mechanical launching and regulation system that provides for launching of a towed aerobody and controlling tow line payout between the towed aerobody and a towing vehicle, said system comprising:

a housing;

a nonrotating member disposed in the housing;

a tow line wound around the nonrotating member and coupled between the towed aerobody and the towing vehicle;

regulation mechanism adapted to regulate unwinding of the tow line from the nonrotating member during payout of the tow line;

a plurality of impulse cartridges disposed in the housing for deploying the aerobody and severing the tow line at a predetermined time; a wedge-shaped tube disposed in the housing and a spring piston disposed inside the wedge-shaped tube that is adapted to confine expanding gasses within the tube that are generated by a selected one of the impulse cartridges and that is adapted to move the spring piston and launch the towed aerobody.

2. The system of claim 1 further comprising:

a load ring disposed on the aerobody; and a disc disposed at an end of the wedge-shaped tube adjacent the load ring that is adapted to contact the spring piston, and wherein the disk is adapted to contact the load ring to distribute force exerted by the spring piston on the aerobody.

3. The system of claim 1 further comprising:

a severing mechanism comprising:

a cylindrical tube;

an anvil disposed at one end of the cylindrical tube; and a piston cutter having a sharp edge that is slidably disposed in the cylindrical tube; and openings disposed between the anvil and the piston cutter, and wherein the tow line is disposed through the opening;

and wherein firing of a second impulse cartridge is adapted to cause the piston cutter to move toward the anvil and wherein the sharp edge severs the tow line when the piston cutter impacts the anvil with the tow line between them.

4. The system of claim 1 wherein the regulation mechanism comprises:

said wedge-shaped tube being rotatable;

a rotatable mechanical regulator slidably coupled to the rotatable wedge-shaped tube that is adapted to rotate with the tube and move transversely along the length of the tube as the tow line is removed from the nonrotating member;

a brake mechanism disposed in the rotatable mechanical regulator, and a brake drum disposed around the periphery of the rotatable mechanical regulator that is adapted to be contacted by the brake mechanism.

5. The system of claim 1 wherein the regulation mechanism comprises:

an adhesive resin coating disposed on the tow line that has an adhesion coefficient that is adapted to permit the tow line to peel off of the nonrotating member at a predetermined rate.

6. The system of claim 5 wherein the adhesion coefficient is varied by increasing the adhesive strength of the adhesive resin that is applied to inner windings of the tow line.

7. The system of claim 1 wherein the tow line comprises a photonic link including an optical fiber.

8. The system of claim 7 wherein the tow line is metalized.

9. The system of claim 8 wherein the tow line further comprises metal conductors.

10. The system of claim 9 wherein the tow line further comprises a structural overbraid.

11. The system of claim I wherein the tow line is wound around the nonrotating member in the form of a pancake winding.

12. The system of claim 1 wherein the regulation mechanism comprises a floating head that is adapted to move down the two line during payout of the tow line in order to regulate payout thereof.

13. The system of claim 4 wherein the regulation mechanism comprises a floating head that is adapted to move down the tow line during payout of the tow line and a plurality of centrifugal brakes that provide a braking action that is proportional to the deployment distance of the tow line and the speed of deployment in order to regulate payout thereof.

* * * * *